Oct. 6, 1942.  H. S. HOFFAR  2,298,011
ANTIFRICTION SCREW DEVICE
Filed March 19, 1941
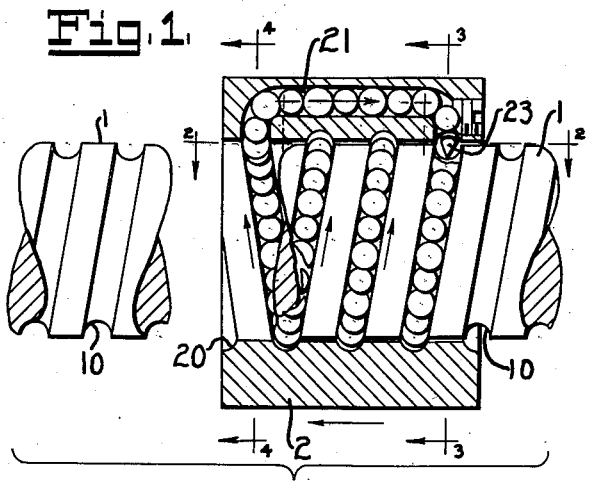
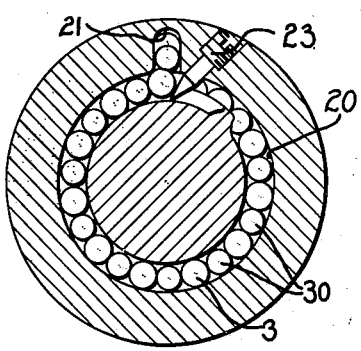
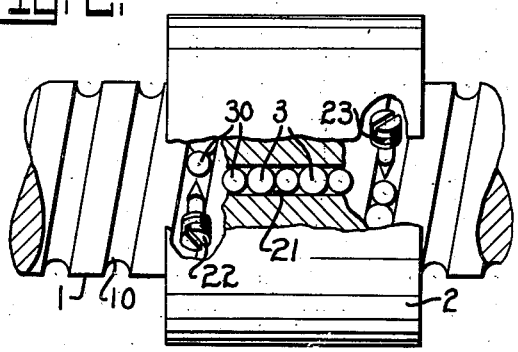
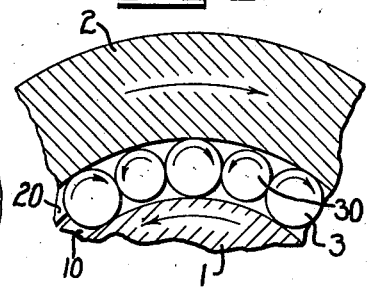
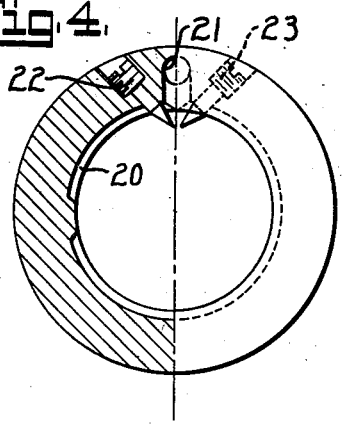
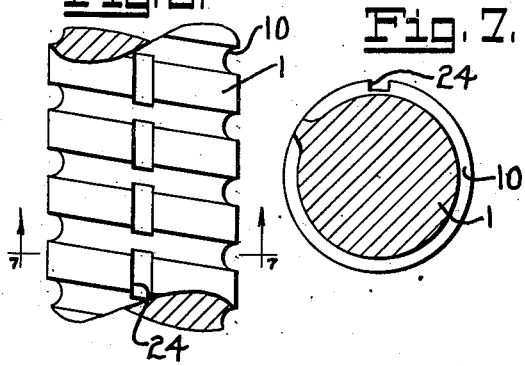
Inventor
Henry S. Hoffar
By Reynolds & Beach
Attorney Patented Oct. 6, 1942

2,298,011

UNITED STATES PATENT OFFICE 2,298,011

ANTIFRICTION SCREW DEVICE

Henry S. Hoffar, Vancouver, British Columbia, Canada, assignor to International Multifeed Drills, Ltd., Vancouver, British Columbia, Canada, a corporation of British Columbia, Canada Application March 19, 1941, Serial No. 384,138

9 Claims. (Cl. 74—459)

Anti-friction screw and nut or screw and gear mechanisms, to which my invention relates generally, have found limited use for special applications, but have not at all generally replaced conventional interengaging thread devices. Such an anti-friction screw and nut arrangement has been used to some extent in steering mechanisms of motor vehicles and in lifting jacks. Anti-friction worm screws and gears have also been proposed but seldom used.

The cost of manufacturing such anti-friction mechanism is, of course, much greater than in the case of conventional threaded members, but the torque required for relatively rotating the screw and nut or gear is considerably less where balls serve as connecting elements between and roll upon the members than where a plain threaded engagement is used, particularly if the parts are under appreciable axial load. Where large axial forces are present previous anti-friction screw and nut mechanisms have proved to be economically unsatisfactory because the torque required to effect relative rotation between the parts has not been reduced in proportion to the increase in cost of such anti-friction mechanism, and, furthermore, mechanisms of the latter type known heretofore have not been able to withstand the loads encountered in such use. When the balls have been free to move along the cooperating grooves of the screw and nut or gear, and have been recirculated from one portion of the complemental grooves to another, very slight relative rotation of the parts has caused the balls to jam together and relative movement thereafter has scored and pitted the contacting balls very quickly.

It has been proposed heretofore to separate the balls from each other in a screw and nut combination and to maintain such spacing by holding each ball either in a cup or cavity provided in the nut or in apertures of a ball cage inserted between and rotatable relative to both the screw and the nut. Such an arrangement would eliminate the friction between the balls but neither of these expedients has solved the problem, for while the balls can not then rub against each other, they do rotate in place relative to their individual nut sockets or to the cage, instead of merely rolling over the surface of the nut engaged, which creates a new or substitute source of friction. Furthermore, when such a cage is rotatable with respect to both the nut and screw only a small relative axial movement of these parts is possible ordinarily without axial separation of the nut and cage. When balls pass beyond the nut they would fall out of the mechanism unless the cage were specially constructed to retain them in such event, and even then a cage much longer than the nut would be required to afford a substantial travel of the nut along the screw.

Prior to my invention, therefore, it had been considered impractical to use an anti-friction screw and nut combination in many possible applications because of the impossibility of preventing excessive wear and mutilation of the balls, and in other instances the use of such mechanism was not justified because the degree of improvement in operation did not warrant the substantial increase in cost. On the contrary, actual tests of my device under very exacting conditions have shown that the torque required to overcome friction during relative rotation of the parts has been reduced to a negligible value, while the mechanism has proved to be dependable and durable, even in devices operating habitually under great axial stress.

The most important feature of my invention is the use of alternate large and small balls interengaged between the screw and nut or gear instead of the balls being all of the same size, as in previous installations. The smaller balls need be only slightly smaller than the larger balls, just enough so that such smaller balls can not seat simultaneously on both the screw and nut or gear, as can the larger balls. The larger balls will therefore carry all of the load and will turn in one direction, while each of the intermediate smaller balls, instead of turning in the same direction and thus rubbing against the adjacent larger balls, will turn in the opposite direction, making only pure rolling contact with the larger balls on each side. All tendency of one ball to mutilate another is thus overcome, and the friction between the balls themselves is virtually eliminated. Even if every alternate ball is not smaller the friction will be reduced to a greater or less extent if some small balls are interspersed among the larger ones.

My preferred mechanism shown in the drawing has other improved features which will be described in detail in the following description. Various minor modifications in the specific structure of my device may be required to adapt it to particular uses, but a practical embodiment is illustrated in the drawing. It will be evident that the same principle is equally well adapted for use in worm screw and gear mechanisms as for a screw and nut combination.

Figure 1 is a longitudinal section through the nut of my device, showing the screw and balls in elevation, while Figure 2 is a side elevation view of my mechanism with parts broken away along line 2—2 of Figure 1 to show particular internal features.

Figure 3 is a transverse section taken on line 3—3 of Figure 1, while Figure 4 is an end elevation view of the nut alone showing one-half in section along line 4—4 of Figure 1.

Figure 5 is an enlarged detail section taken transversely through a portion of the screw and nut combination.

Figure 6 is a plan view, and Figure 7 is a transverse section taken along line 7—7 of Figure 6, showing a special form of screw for use in an anti-friction screw and nut arrangement.

The application of my invention to an anti-friction screw and nut combination is well illustrated in Figures 1 and 5. It is particularly well adapted for installations requiring considerable axial movement between the nut and screw, and where such relative movement entails the exertion of a large axial force upon the members, such as where the screw is attached to a broach and the nut is rotated to move the screw lengthwise for pulling the broach through or along the work, as an example.

The general characteristics of one form which my anti-friction screw and nut arrangement may take, as shown in Figure 1, include a screw the maximum diameter of which is somewhat less than the minimum diameter of the nut associated with it. The screw member has a spiral groove in its surface which in cross section is slightly less than a semicircle. Likewise the nut 2 has within its bore a complemental spiral groove inclined in the same direction, and at the same pitch or degree of inclination as the spiral groove 10 in the screw 1. This nut groove likewise has a cross section of slightly less than semicircular shape.

Because of the relative diameters of the screw and of the nut bore, when no balls are in the grooves it will be evident that the nut may be moved lengthwise along the screw without any relative rotation between them. If the complemental grooves of the nut and screw are placed in coinciding relationship, however, balls may be inserted between the members to seat in both the nut and screw grooves, which will interconnect the nut and screw and transmit axial forces from one to the other.

As the nut and screw are rotated relatively the balls seating in the grooves of both members will also rotate, and, being free to move relative to both members, will roll along the screw groove in the same direction as the nut turns, but at one-half the circumferential speed of the nut. As the nut moves axially along the screw, therefore, the balls will not keep pace with it, so that the nut would progress past the balls one by one, unless some provision were made for preventing this occurrence. Because of this lag behind the nut in axial progression of the balls, an expedient for recirculating the balls is shown in Figure 1, consisting of a by-pass passage 21 formed in the nut which communicates between two spaced portions of the nut groove. Between these portions the groove will be filled with balls, and beyond them, toward either end, no balls will be present.

As the nut 2 is rotated relative to the screw 1 in a clockwise direction it will progress to the right, as shown by the arrow beneath it. The balls will also progress along the groove 10 of the screw 1 to the right, as indicated by the arrows, but at one-half the speed of the nut. With respect to the groove of the nut, therefore, the balls will be progressing in the opposite direction, as shown by the arrow at the left of Figure 1, so that they move into the left end of the passage 21 and toward the right along that passage, as indicated, to be fed into the nut groove ahead of the balls interengaged between the nut and screw past which the opening at the right end of passage 21 moves. Instead of the balls becoming permanently ineffective by passing out from between the screw and nut, therefore, they merely move into the by-pass passage 21 through which they are fed forward into a new position interengaged between the screw and nut. It will be evident that this recirculation of the balls continues indefinitely during rotation of the nut clockwise relative to the screw, and the recirculation will occur in the opposite direction when the direction of rotation of the nut is reversed.

In Figures 2, 3, and 4 are shown the deflecting pins 22 which scoop the balls out of the screw groove as the left end of passage 21 approaches them in the operation described with relation to Figure 1. A similar pin 23 blocks the complemental nut and screw grooves adjacent the right end of passage 21 so that the balls will be guided backward into such grooves. When the direction of nut rotation is reversed, of course, this pin 23 acts to scoop the balls from the co-operating grooves into the by-pass passage 21, and the pin 22 guides the balls back into the nut and screw grooves.

The particular type of deflecting pin shown has proven to be very effective, yet it is simple to construct and easy to adjust. As will be noted in Figures 3 and 4 particularly it has a conical end having an apex angle of about 15°. The axes of these pins, when in place, are preferably at an angle of about 45° to the radial plane through the passage 21. The heads of these pins 22 and 23 are threaded so that they may be screwed into the nut in the manner shown until their inner ends engage the bottom of the groove in the screw. They may then be turned slightly in the reverse direction to retract their inner ends sufficiently to clear the screw. As an alternative construction the shouldered portion of each pin may be of such length with respect to the counterbored portion of its socket that interengagement of such shoulder and counterbore end will terminate inward movement of the pin when its inner end has reached its proper degree of inward projection short of the screw, as shown in Figure 4.

Where such recirculating ball, anti-friction nut and screw combinations have been used heretofore all the balls have been of the same size. In an attempt to decrease friction between them it has been suggested that sufficient space be left to enable the balls to be separated by a slight amount. This expedient has proven unsuccessful to reduce such friction, however, because after very slight relative rotation of the screw and nut the balls jam together and very nearly as much friction as ever is produced.

I have found that virtually all friction can be eliminated if, as shown in the drawing, alternate balls 30 are made sufficiently smaller than the balls 3 seating in the screw and nut grooves that such smaller balls can rotate with respect to these grooves without appreciable frictional engagement therewith. During relative rotation of the screw and nut, therefore, in the direction indicated by the arrows in Figure 5, the larger balls 3 will turn as shown, while each smaller ball 30 will rotate in the opposite direction between and in engagement with the adjacent larger balls on each side of it. This rolling contact between all adjacent balls is not accompanied by any substitute source of friction which need be considered. Any slight contact of the smaller balls 30 with the screw or nut grooves creates little resistance to rotation because no appreciable pressure is created between the surfaces, the load substantially all being carried by the larger balls 3. I have found that sufficient clearance to achieve this purpose is provided if the smaller balls are made five thousandths of an inch smaller in diameter than the larger ones. Even though every second ball is not smaller than the others, an appreciable reduction in friction will be obtained if a lesser number of small balls are interspersed among the larger balls, all adjacent smaller balls being separated by at least one larger ball so that they all will rotate counter to the large ones, and the reduction in friction thus accomplished will be generally proportionate to the number of smaller balls thus employed.

The only disadvantage to using smaller balls in conjunction with larger balls is that, as stated, the axial load between the parts must substantially all be carried by the larger balls. This feature is not a serious disadvantage, however, because, with the reduction in friction, the length of the nut, and hence the effective length of the complemental ball receiving grooves, can be increased almost indefinitely without any appreciable increase in friction. By this expedient the number of load-carrying balls 3 can not only be kept the same, but their number can be increased to any reasonable extent desired. As a matter of fact, previous experience with devices having balls all of the same size has proven that the load-carrying capacity of such interengaged balls is not the critical factor; rather wear and defacing of the balls occurred not because of the axial load to which they were subjected, but because of the friction between the balls themselves. With this eliminated by my alternate large and small ball arrangement it may not be necessary to provide as many load-carrying balls as previously employed, but in any event the number may be increased as explained above without any appreciable increase in resistance to relative rotation of the screw and nut. Thus it is possible to double the total number of balls, retaining the same number of load-carrying balls but separating them by interposition of alternate balls, merely by increasing the length of orbital path through which the balls travel.

The striking ability of my mechanism to reduce friction may be best appreciated by reference to a specific, typical installation in which the construction described generally above has been employed. In that instance a steel screw having a pitch diameter of 1⅜ inches and with three threads per inch was attached to a draw broach which required a pull of approximately 9000 pounds to move it axially. Three types of nut were employed in different instances to move this broach, each with a screw having the above characteristics, the nuts being turned in each case by a force applied to the end of a 36-inch lever. Under this axial load it was found that a force of 44 pounds had to be exerted on such lever arm where a plain brass nut with conventional screw thread engagement was used, whereas with an anti-friction nut and screw combination employing balls all of the same size a force of 25 pounds was required on the same lever arm, as compared with a force of only 13.9 pounds needed to turn the nut when alternate large and small balls were incorporated in the same screw and nut arrangement. In this latter case one hundred twenty balls were present in the recirculating orbit, which included six consecutive convolutions around the screw.

The theoretical force necessary to pull this broach, entirely neglecting friction, is calculated by developing the pitch circumference of the screw into an inclined plane along which the force acts, which is equal to $$\frac{9000}{(1\tfrac{3}{8})(\pi)(3)}$$

or 694 pounds. This is the net force which must push against the screw thread at the pitch radius of 11/16 inch in order to move the broach. The theoretical force, therefore, which must be applied to the 36-inch lever arm to create a force of 694 pounds at the pitch circle is $$\frac{(694)(1\tfrac{1}{16})}{36}$$

which equals 13.25 pounds.

Subtracting this theoretical force of 13.25 pounds, which entirely neglects friction, from the force of 13.9 pounds measured when using my anti-friction screw and nut combination, the force utilized to overcome friction was only 13.9 pounds less 13.25 pounds or .65 pound, creating 23.4 inch pounds of torque. Where balls all of the same size were employed a force on the lever arm of 25 pounds less 13.25 pounds, or 11.75 pounds, creating a torque of 423 inch pounds, was required to overcome friction. In the case of the plain screw thread arrangement the force exerted solely for the purpose of overcoming friction was 44 pounds less 13.25 pounds or 30.75 pounds, creating a torque of 1107 inch pounds. Thus while the use of an anti-friction screw and nut combination containing recirculating balls all of the same size does very materially reduce the friction over conventional screw thread mechanism, nevertheless, as indicated by the above figures, that present where alternate large and small balls are employed is negligible by comparison, the required force being only about 1/20 of that which must be exerted where the balls are all of uniform size. It will therefore be evident that my device can be operated by a force not appreciably in excess of that theoretically required merely to overcome the axial load no matter how great such load may be.

Another very important advantage in the use of my construction incorporating alternate small and large balls, or at least a substantial number of small balls interspersed among the larger balls, is the smoothness of operation obtained. As pointed out above, balls all of the same size, even though they may be spaced slightly apart when rotation is initiated, jam together after slight rotation of the parts and rub against each other, creating a very substantial amount of friction. Moreover, this condition is not constant, for a slight rebound tendency occurs as the balls bind, so that at intervals they jump apart again in concert. Instead of the progression of the nut being smooth, therefore, creating a constant resistance to rotation, the mechanism will alternately bind and release to a greater or less extent, so that if a constant force is applied to rotate the nut its rotation, and hence is axial translation relative to the screw will be jerky, rather than smooth and at a uniform rate.

With my mechanism, however, this binding tendency is entirely eliminated, for the rolling contact between the engaging large and small balls occurs smoothly and constantly, so that there is no tendency for the balls to jam together to create a binding action temporarily increasing the resistance to relative rotation of the parts. The jerky advance of the screw and nut combination where the balls are all of the same size is a disadvantage not even found where plain threads are used, and this characteristic makes the previously known type of anti-friction screw and nut arrangement unsuitable for some purposes despite the reduction in friction over plain threads obtained by its use. This feature would not be particularly detrimental in a jack construction, but would be very objectionable in mechanism for effecting a draw broaching or a drilling operation, where smoothness of the cutting action is a primary consideration.

It will therefore be evident that the interposition of smaller balls between the larger balls in such a screw and nut combination as illustrated in the drawing not only virtually eliminates the friction between the parts, however great the axial load may be, but in addition provides a smoother, more dependable, and more easily regulated operation. The principle employed in the screw and nut structure illustrated and described above is equally well adapted to other types of screw and nut mechanisms, and in addition to worm and gear combinations. In fact my invention will greatly improve any combination of a screw and cooperating member which is axially movable relative to the screw, if a recirculation of the balls between the members is desirable, for in such instances the recirculating path can be lengthened almost without limit to increase the load carrying capacity of the mechanism while still preserving the efficiency of operation and wear resistant characteristics of my arrangement.

Figures 6 and 7 show a screw in which a keyway 24 is provided for engagement by a member movable lengthwise of the screw, but rotative with it. To prevent jumping of the balls as they pass the keyway it is made of a lesser depth than the depth of the ball receiving groove, as shown in Figure 7. Instead of the keyway extending continuously throughout the length of the screw, therefore, it will be interrupted by each convolution of the screw's groove 10, as shown clearly in Figure 6. As will be apparent, with this construction the balls seating in the groove of the screw can roll smoothly along its bottom past the keyway without interference. The width of the keyway may, of course, be as great as desired, for movement of the balls into it would be prevented not only by its relatively small depth, but by the absence of any corresponding aperture in the wall of the nut groove 20.

What I claim as my invention is:

1. In combination, a screw member, a cooperating member having a groove of helical inclination complementary to the screw member helix, which cooperating member groove is movable axially relative to said screw member, a plurality of balls interengaged between said two members in the grooves thereof for transmitting force from one to the other, and means defining with said screw member and said cooperating member an orbit guiding said balls for recirculation between said members, said balls including load-carrying balls of a size to seat simultaneously upon both of said members, and balls smaller than and interspersed among said load-carrying balls for rolling contact therewith.

2. In combination, a screw member, a cooperating member having a groove of helical inclination complemental to the screw member helix, which cooperating member groove is movable axially relative to said screw member, a plurality of balls interengaged between said two members in the grooves thereof for transmitting force from one to the other, and means defining with said screw member and said cooperating member an orbit guiding said balls for recirculation between said members, said balls including load-carrying balls of a size to seat simultaneously upon both of said members, and balls smaller than and interspersed among said load-carrying balls for rolling contact therewith, adjacent smaller balls in every instance being spaced from each other by at least one of said load-carrying balls.

3. In combination, a screw member, a cooperating member having a groove of helical inclination complemental to the screw member helix, which cooperating member groove is movable axially relative to said screw member, a plurality of balls interengaged between said two members in the grooves thereof for transmitting force from one to the other, and means defining with said screw member and said cooperating member an orbit guiding said balls for recirculation between said members, said balls including load-carrying balls of a size to seat simultaneously upon both of said members, and balls smaller than said load-carrying balls disposed in alternate arrangement between said load-carrying balls for rolling contact therewith, thereby to space apart all adjacent load-carrying balls.

4. In combination, a generally cylindrical member having therein an external helical groove, a cooperating member having a concave surface curved generally complemental to the curvature of said cylindrical member, said concave surface having therein a groove inclined in a direction and to a degree corresponding to the inclination of the helical groove in said first member, a plurality of balls all of equal size interengaged between said two members and seating in the grooves thereof, a second set of balls of slightly smaller size than the balls of said first set, single balls of said second set being interposed between adjacent balls of said first set for rolling contact therewith, said cooperating member having a by-pass passage with opposite ends opening into portions of its helical groove spaced apart axially a plurality of full turns, to guide all said balls for movement between such axially spaced groove portions.

5. In combination, a generally cylindrical member having therein an external helical groove, a cooperating member having a concave surface curved generally complemental to the curvature of said cylindrical member, said concave surface having therein a groove inclined in a direction and to a degree corresponding to the inclination of the helical groove in said first member, a plurality of balls all of equal size interengaged between said two members and seating in the grooves thereof, a second set of balls of slightly smaller size than the balls of said first set, single balls of said second set being interposed between adjacent balls of said first set for rolling contact therewith, said cooperating member having a by-pass passage with opposite ends opening into axially spaced portions of its groove, to guide all said balls for movement between such axially spaced groove portions.

6. In combination, a cylindrical screw including a helical groove, a nut encircling said screw and having an internal groove inclined in a direction and to a degree corresponding to the inclination of the helical groove of said screw, a plurality of balls interengaged between said screw and nut and seating in the grooves thereof, said nut having a by-pass passage extending generally lengthwise thereof and with opposite ends extending substantially radially and opening into axially spaced portions of its groove, to guide said balls for movement between such axially spaced groove portions, and a cylindrical deflecting pin extending through said nut at an acute angle to the adjacent by-pass passage opening axis and having a conical inner end projecting into its groove adjacent an opening of such by-pass passage, for deflecting balls from said groove into the by-pass passage.

7. In combination, a rod having an external helical groove in its surface, a nut encircling said rod and having therein an internal helical groove directed in the same direction and with the same pitch as the helical groove in said rod, and alternate large and small balls interengaged between said rod and said nut and received in the grooves of both, said large balls seating in the grooves of both said rod and said nut for transmitting load from one to the other, said small balls being only slightly smaller than said large balls, and said nut having therein a by-pass passage extending generally lengthwise thereof between and opening into portions of its groove spaced apart axially, for passage of the balls through such passage between such axially spaced portions of its groove.

8. In combination, a rod having an external helical groove in its surface, a nut encircling said rod and having therein an internal helical groove directed in the same direction and with the same pitch as the helical groove in said rod, alternate large and small balls interengaged between said rod and said nut and received in the grooves of both, said large balls seating in the grooves of both said rod and said nut for transmitting load from one to the other, said small balls being only slightly smaller than said large balls, and said nut having therein a by-pass passage extending generally lengthwise thereof between and opening into portions of its groove spaced apart axially, for passage of the balls through such passage between such axially spaced portions of its groove, the openings into said by-pass passage being disposed substantially radially of said nut, and a cylindrical deflecting pin adjustably threaded into said nut at an angle of approximately 45 degrees to the adjacent by-pass passage opening axis, and having a conical inner end projecting into its groove adjacent such opening, for deflecting balls from said groove through such opening into the by-pass passage.

9. In combination, a rod having an external helical groove in its surface, and having a keyway extending axially thereof of a depth not greater than the depth of said groove, a nut encircling said rod and having therein an internal helical groove directed in the same direction and with the same pitch as the helical groove in said rod, and alternate large and small balls interengaged between said rod and said nut and received in the grooves of both, said large balls seating in the grooves of both said rod and said nut for transmitting load from one to the other, said small balls being only slightly smaller than said large balls, and said nut having therein a by-pass passage extending lengthwise thereof between and opening into portions of its groove spaced apart axially, for passage of the balls through such passage between such axially spaced portions of its groove.

HENRY S. HOFFAR.